(12) United States Patent
Petrosian et al.

(10) Patent No.: US 12,434,584 B2
(45) Date of Patent: *Oct. 7, 2025

(54) PERFORMING ACTIONS ASSOCIATED WITH A CONNECTED VEHICLE

(71) Applicant: RECARGO, INC., El Segundo, CA (US)

(72) Inventors: Armen Petrosian, Venice, CA (US); Lucas Manfield, Venice, CA (US); Forrest North, Venice, CA (US); Nick Wild, Venice, CA (US)

(73) Assignee: RECARGO, INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,674

(22) Filed: Jun. 7, 2021

(65) Prior Publication Data

US 2021/0291847 A1 Sep. 23, 2021

Related U.S. Application Data

(63) Continuation of application No. 16/200,388, filed on Nov. 26, 2018, now Pat. No. 11,027,622, which is a
(Continued)

(51) Int. Cl.
*B60L 53/30* (2019.01)
*B60L 3/00* (2019.01)
(Continued)

(52) U.S. Cl.
CPC .......... *B60L 53/305* (2019.02); *B60L 3/0023* (2013.01); *B60L 53/30* (2019.02); *B60L 53/665* (2019.02);
(Continued)

(58) Field of Classification Search
CPC ...... B60L 53/305; B60L 53/665; B60L 58/10; B60L 58/12; B60L 58/16; B60L 58/30;
(Continued)

(56) References Cited

U.S. PATENT DOCUMENTS 5,491,631 A * 2/1996 Shirane ............... F02D 41/22
701/33.9
8,089,169 B2 1/2012 Maeda
(Continued)

FOREIGN PATENT DOCUMENTS

DE 10235163 A1 2/2004

*Primary Examiner* — Calvin Cheung
(74) *Attorney, Agent, or Firm* — AMPACC Law Group, PLLC

(57) ABSTRACT

Systems and methods for collecting data from electric vehicles, and performing various different actions based on the collected data, are described. In some embodiments, a device, such as a remote device that communicates with a server, connects with a controller area network (CAN) of an electric vehicle, and collects data from the CAN and/or other types of data associated with the electric vehicle (e.g., geographical information that identifies a location of an electric vehicle, movement information that identifies whether the electric vehicle is in motion or not, and so on). The systems and methods may perform various actions using some or all of the collected data.

15 Claims, 9 Drawing Sheets

Related U.S. Application Data continuation of application No. 14/622,225, filed on Feb. 13, 2015, now Pat. No. 10,137,795.

(60) Provisional application No. 61/939,618, filed on Feb. 13, 2014.

(51) Int. Cl.
| | | |
|---|---|---|
| *B60L 53/66* | (2019.01) | |
| *B60L 58/10* | (2019.01) | |
| *B60L 58/12* | (2019.01) | |
| *B60L 58/16* | (2019.01) | |
| *B60W 10/26* | (2006.01) | |
| *B60W 50/02* | (2012.01) | |
| *G07C 5/00* | (2006.01) | |
| *G07C 5/08* | (2006.01) | |
| *H04L 12/40* | (2006.01) | |

(52) U.S. Cl.
CPC ............... *B60L 58/10* (2019.02); *B60L 58/12* (2019.02); *B60L 58/16* (2019.02); *B60W 10/26* (2013.01); *B60W 50/0205* (2013.01); *G07C 5/008* (2013.01); *G07C 5/0808* (2013.01); *H04L 12/40* (2013.01); *B60L 2240/34* (2013.01); *B60L 2240/36* (2013.01); *B60L 2240/662* (2013.01); *B60L 2250/10* (2013.01); *B60L 2260/50* (2013.01); *B60W 2510/244* (2013.01); *B60W 2556/45* (2020.02); *H04L 2012/40215* (2013.01); *H04L 2012/40273* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC ............... B60L 3/0023; B60L 2240/34; B60L 2240/36; B60L 2240/662; B60W 10/26; B60W 50/0205; B60W 2510/244; B60W 2556/45

See application file for complete search history.

(56) References Cited

U.S. PATENT DOCUMENTS

| | | | |
|---|---|---|---|
| 9,188,449 B2* | 11/2015 | Biswal | ............... G01C 21/3697 |
| 2006/0047382 A1 | 3/2006 | Morioka et al. | |
| 2009/0190376 A1 | 7/2009 | Morita et al. | |
| 2010/0141204 A1 | 6/2010 | Tyler et al. | |
| 2010/0305798 A1 | 12/2010 | Phillips et al. | |
| 2011/0130916 A1 | 6/2011 | Mayer | |
| 2012/0109515 A1 | 5/2012 | Uyeki et al. | |
| 2012/0150464 A1 | 6/2012 | Swanton | |
| 2012/0203421 A1 | 8/2012 | Newhouse | |
| 2012/0296512 A1 | 11/2012 | Lee et al. | |
| 2012/0330494 A1 | 12/2012 | Hendrix et al. | |
| 2013/0015814 A1 | 1/2013 | Kelty et al. | |
| 2013/0076296 A1 | 3/2013 | Ushiroda | |
| 2013/0135110 A1 | 5/2013 | Jian et al. | |
| 2013/0151293 A1 | 6/2013 | Karner et al. | |
| 2014/0081493 A1 | 3/2014 | Shemyakin et al. | |
| 2014/0103866 A1 | 4/2014 | Kothavale et al. | |
| 2014/0114448 A1 | 4/2014 | Outwater et al. | |
| 2014/0358459 A1 | 12/2014 | Trnka et al. | |
| 2014/0368668 A1 | 12/2014 | Sasabuchi et al. | |
| 2015/0019115 A1 | 1/2015 | Kim | |
| 2015/0066224 A1 | 3/2015 | Uyeki | |
| 2015/0294329 A1 | 10/2015 | Saito et al. | |
| 2016/0163127 A1 | 6/2016 | Kim et al. | |

\* cited by examiner

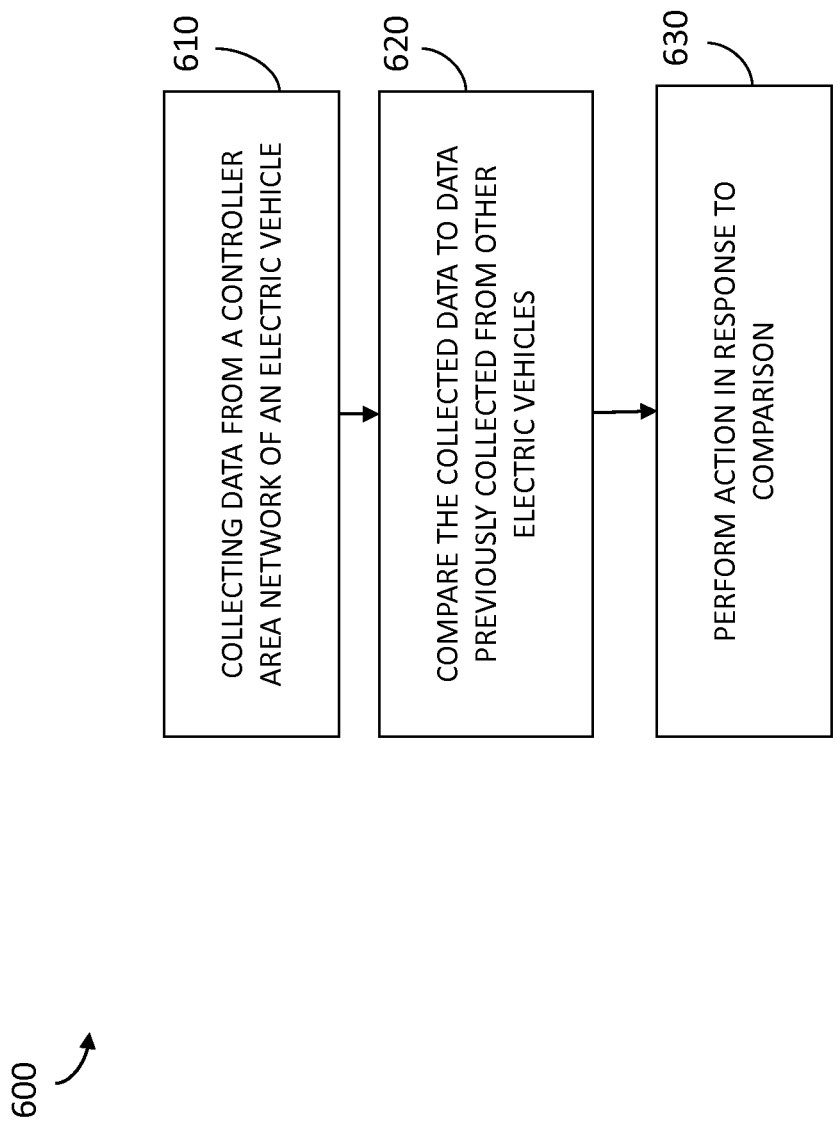

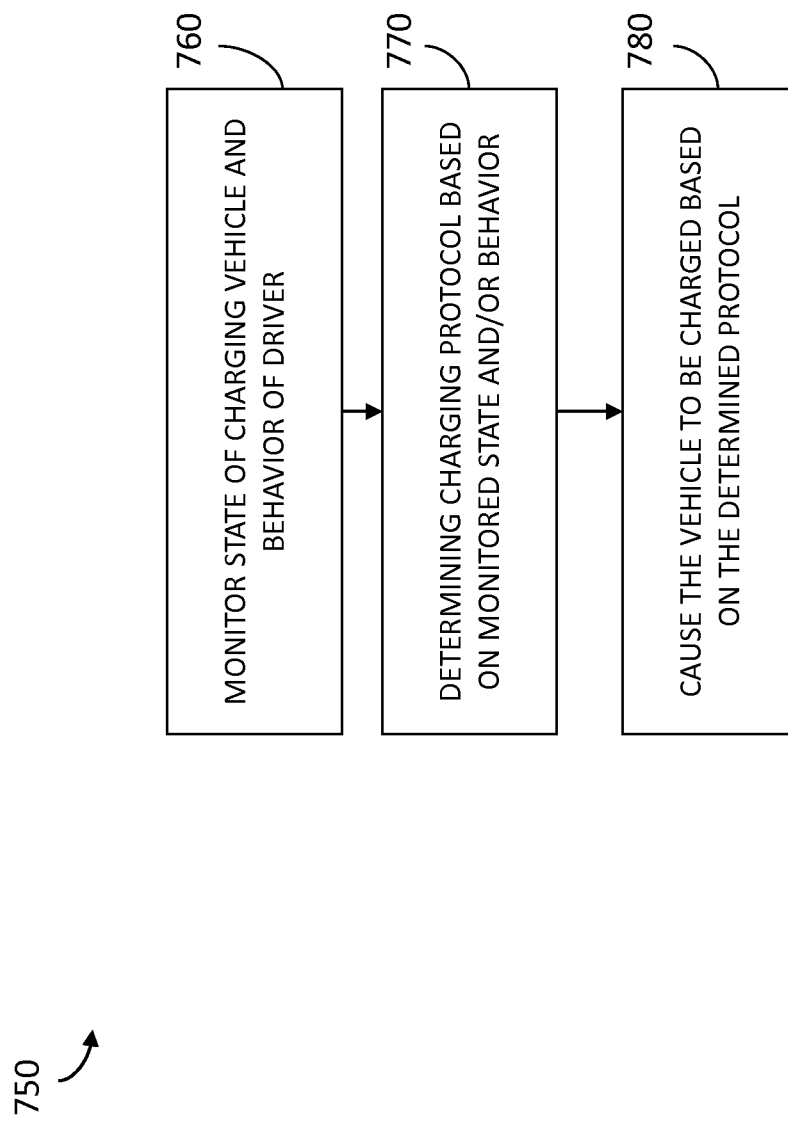

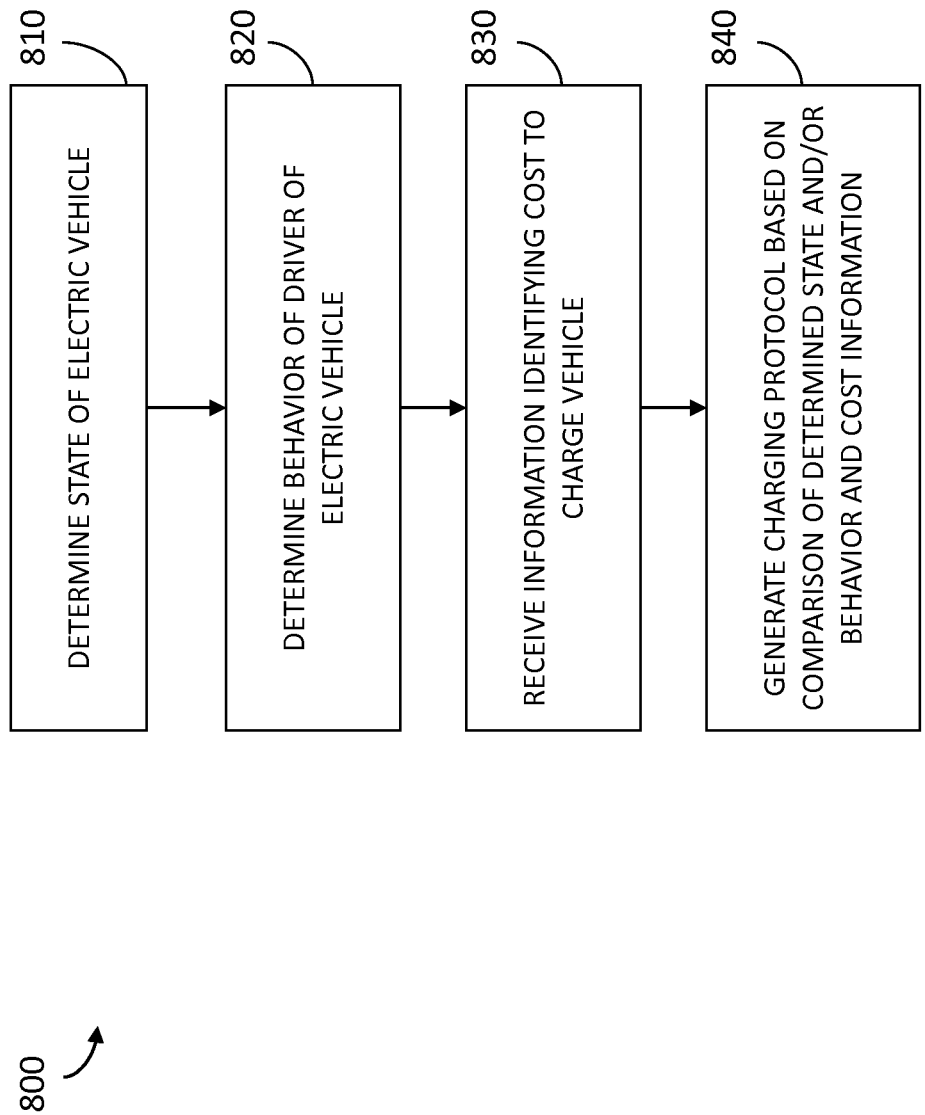

PERFORMING ACTIONS ASSOCIATED WITH A CONNECTED VEHICLE

CROSS REFERENCE TO RELATED APPLICATIONS

This application is a continuation of U.S. patent application Ser. No. 16/200,388, filed Nov. 26, 2018, now U.S. Pat. No. 11,027,622, which is a continuation of U.S. patent application Ser. No. 14/622,225, filed Feb. 13, 2015, now U.S. Pat. No. 10,137,795, which claims priority to U.S. Provisional Patent Application No. 61/939,618, filed on Feb. 13, 2014, entitled "PERFORMING ACTIONS ASSOCIATED WITH A CONNECTED VEHICLE," both of which applications are hereby incorporated by reference in their entireties.

BACKGROUND

Although the adoption of electric vehicles is increasing, there are still many people that find them confusing or inaccessible, or are otherwise not interested in using electric vehicles for their transportation needs. Therefore, technology is being developed to remove such barriers associated with the adoption of electric vehicles.

BRIEF DESCRIPTION OF THE DRAWINGS

FIG. 6 is a flow diagram illustrating a method for performing an action based on a comparison of data collected from controller area networks of electric vehicles.

FIG. 7B is a flow diagram illustrating a method for charging an electric vehicle using a determined charging protocol.

FIG. 8 is a flow diagram illustrating a method for generating a charging protocol for an electric vehicle.

DETAILED DESCRIPTION

Overview

Figure 1:
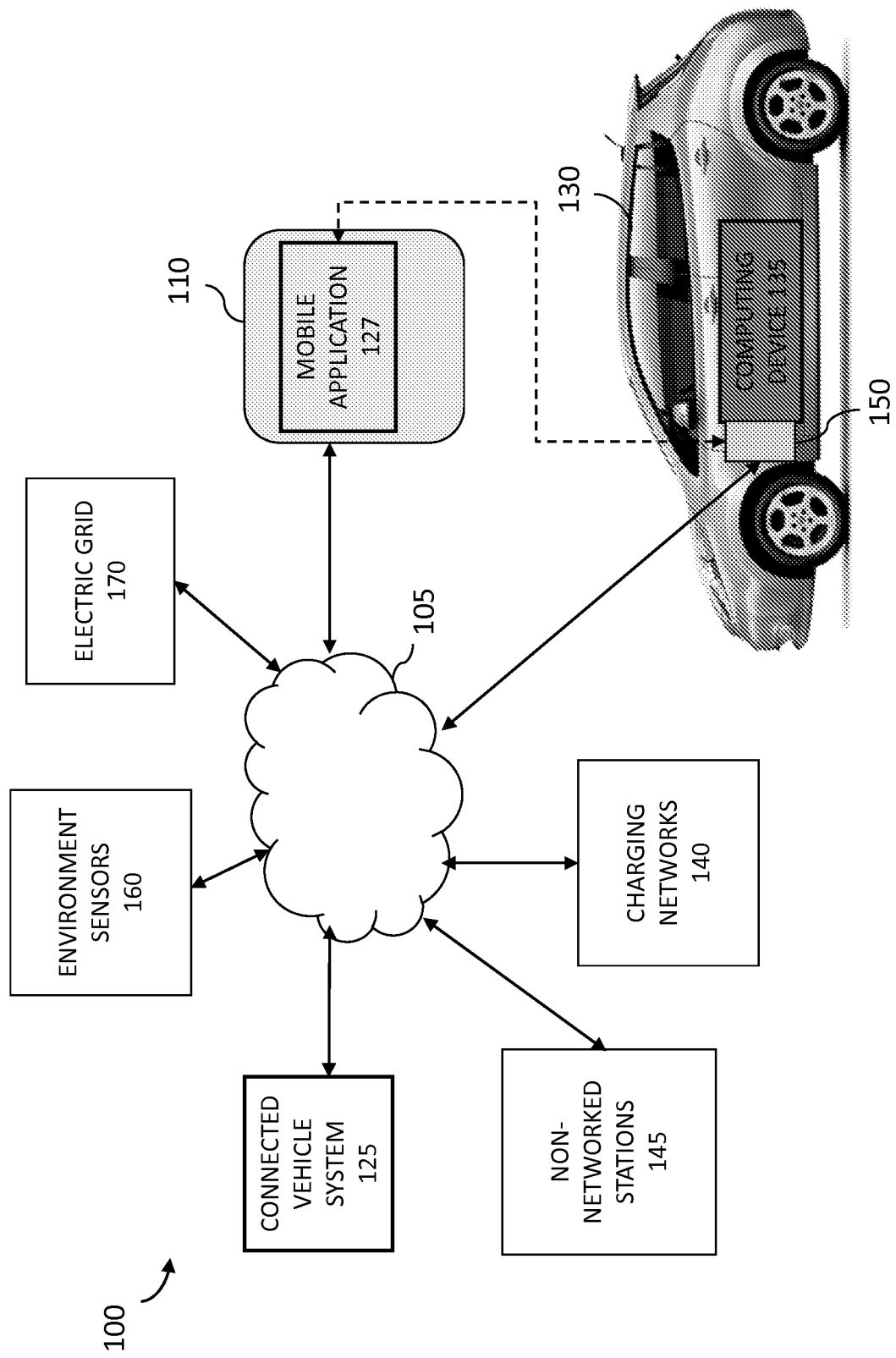
FIG. 1 is a block diagram illustrating components of a suitable computing environment.

Systems and methods for collecting data from electric vehicles, and performing various different actions based on the collected data, are described. In some embodiments, a device, such as a remote device that communicates with a server, connects with a controller area network (CAN) of an electric vehicle, and collects data from the CAN and/or other types of data associated with the electric vehicle (e.g., geographical information that identifies a location of an electric vehicle, movement information that identifies whether the electric vehicle is in motion or not, and so on). The systems and methods may perform various actions using some or all of the collected data.

For example, the remote device may include a connection component that is configured to connect the device to the controller area network (e.g., the CAN bus) of the electric vehicle and capture information from the controller area network, a location component (e.g., GPS sensor) that is configured to capture information associated with a location of the electric vehicle, a motion component (e.g., accelerometer) that is configured to capture information associated with movement of the electric vehicle, and/or a communication component (e.g., GSM chip) that is configured to transmit information captured by the device to a server component, such as a server that performs actions in response to the data associated with the electric vehicle that is collected by the remote device.

In some embodiments, the systems and methods may access data captured by the remote device from the controller area network of the electric vehicle and/or access data captured by sensors contained by the remote device, and determines a state of the electric vehicle based on the accessed data. The systems and methods may perform an action that is associated with the determined state.

In some embodiments, the systems and methods may collect data from the controller area network of the electric vehicle, compare the collected data to data collected from a group of electric vehicles that includes the electric vehicle, and perform an action in response to the comparison. For example, the systems and methods may generate and/or transmit an alert message when the comparison identifies a potential failure event at or for one or more components of the electric vehicle.

In some embodiments, the systems and methods may monitor charge states of multiple vehicles within a group of vehicles, determine an order via which to charge the group of vehicles based on the monitored charge states, and cause the vehicles to be charged in the determined order.

The systems and various performed methods will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

As described herein, systems and methods for collecting data from electric vehicles, and performing various different actions based on the collected data, are described. FIG. 1 illustrates components of a suitable computing environment 100 in which a connected vehicle system 125 and associated data collection device 150 may be supported and/or implemented. The computing environment 100 includes a mobile device 110, such as a mobile phone or tablet computer that supports and provides applications (e.g., "apps") to a user of the mobile device 110. For example, the mobile device 110 may include a mobile application 127 provided by and/or associated with the connected vehicle system 125. The mobile application 127 may communicate with other mobile applications (e.g., a mapping application), the connected vehicle system 125, one or more charging networks 140, one or more non-network charging stations (e.g., home charging stations) 145, and/or the data collection device 150 that connects to a computing device 135 supported by an electric vehicle 130, over a network 105, such as the internet or other wireless or telecommunication networks. The electric vehicle (EV) 130 may be a vehicle such as a plugin hybrid, range extended hybrid, electric traction or battery or plugin vehicle, and may connect to charging stations 145 or charging stations provided by one or more disparate charging networks 140 in order to charge batteries or other energy storage components of the EV.

The mobile device 110 may be a tablet computer, mobile device, smart-phone, net-book, mobile GPS navigation device, or any other device that supports, presents, and/or displays apps via a user interface, such as a touch-screen, of the device. The mobile device 110 includes various hardware and/or software components in order to provide such functionality. For example, the mobile device 110 includes various human interface components, device components, and memory, and so on.

The mobile device 110 may include a touch-screen or other input component that provides input to a processor. The touch-screen may include or communicate with a hardware controller, such as a touch-screen driver, that interprets raw signals received from the touch-screen and transmits information associated with a contact event (e.g., a pressing of an app via the touch-screen), to the processor. The touch-screen may be part of a display, such as a touch-screen display, a flat panel display, an electronic ink display, a head-mounted display, a liquid crystal display, a light-emitting diode display, a plasma panel display, an electroluminescent display, a vacuum fluorescent display, a digital projector, a laser projector, a heads-up display, and so on. The mobile device 110 may include other interface components, such as a speaker that provides appropriate auditory signals to assist a user in navigating a touch-screen, and so on.

The mobile device 110 and/or the data collection device 150 may include various device components, such as sensors (e.g., GPS or other location determination sensors, motion sensors, gyroscopes, light sensors, and so on), removable storage devices (e.g., SIM cards), cameras and other video capture devices, microphones and other audio capture devices, communication devices (e.g., Bluetooth devices, radios, antennas), and so on.

The mobile device 110 and/or the data collection device 150 may include a processor that communicates with data or applications stored in memory of the device 110, which may include a combination of temporary and/or permanent storage, and both read-only and writable memory (random access memory or RAM), read-only memory (ROM), writable non-volatile memory such as FLASH memory, hard drives, floppy disks, SIM-based components, and so on. The memory may include various program components or modules, such as an operating system, and various applications, such as applications downloaded to the devices 110 or 150. For example, the memory may store applications native to the device that perpetually operate on the device (e.g., a keyboard application that provides a virtual keyboard, a text messaging application, and so on) as well as applications that are downloaded by a user and launched by the device (e.g., applications associated with social networking sites, games, and so on).

The memory may store one or more applications associated with an electric vehicle, such as the mobile application 127, which facilitates communications between the mobile device 110 and an electric vehicle 130, the computing device 135 of the electric vehicle 130, the charging networks 140, the charging stations 145, and/or a server supporting the connected vehicle system 125.

For example, the mobile application 127 may communicate over the network 105 with the data collection device 150 that is connected to the computing device 135 of the electric vehicle 130, the charging networks 140, the charging stations 145, and/or the connected vehicle system 125. The network 105 may be a Local Area Network (LAN), a Wide Area Network (WAN), the Internet, or other networks capable of facilitating various communications between computing devices.

In some embodiments, the mobile application 127 may communicate directly with various components of the computing environment 100. The mobile device 110 may include various communication components (e.g., Bluetooth) that facilitate short range, near field, and/or other direct or personal area network communications between devices. For example, the mobile application 127 may utilize Bluetooth communication to exchange data with the charging networks 140 and/or the charging stations 145 when other networks are unavailable or inaccessible (e.g., when the EV 130 is at charging stations 145 in an underground parking lot that does not receive sufficient wireless or telecommunication signals).

The computing device 135, which may include or be part of a controller area network (CAN), or CAN bus, of the electric vehicle 130, may include various computing components and/or modules configured and/or programmed to control, manage, diagnose, or otherwise interact with components of the electric vehicle 130. For example, the EV computing device 135 may include an on-board computing system that includes on-board diagnostics, such as components configured and/or programmed to detect and/or receive information from the electric vehicle's engine, battery pack, various sensors, dashboard controls, and so on. The components may detect, sense, and/or capture various types of information, such as outside temperature information, inside temperature information, internal engine or component temperatures, motor rpm information, motor temperature information, power consumption information, charger temperature information, information associated with peak power consumption, location or geographical information, tire pressure information, tire temperature information, information captured by seat pressure sensors, error codes or other operational information, and so on. For example, the components may detect, receive, and/or access motor controller information, such as information associated with the power, voltage, current, frequency, waveform, modulation, and/or regenerative power of the motor of the EV, as well as information from modules which control ancillary functions of the EV, such as information associated with operations of the lights, wipers, anti-lock brakes, seat warmers, music, climate controls, light sensors, smoke sensors, acceleration sensors, and other ancillary operations of an EV.

The computing device 135 may also include various direct communication components, such as radios or other data transmission devices (e.g., Bluetooth, Wi-Fi-, two-way, and so on) configured and/or programmed to transmit information from the EV computing device 135 to devices (e.g., device 150) connected to and/or located remotely from the electric vehicle 130, such as the mobile device 110, the charging networks 140, the charging stations 145, and so on.

FIG. 1 and the discussion herein provide a brief, general description of a suitable computing environment in which the connected vehicle system 125 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Examples of Collecting Data from an Electric Vehicle

Figure 2:
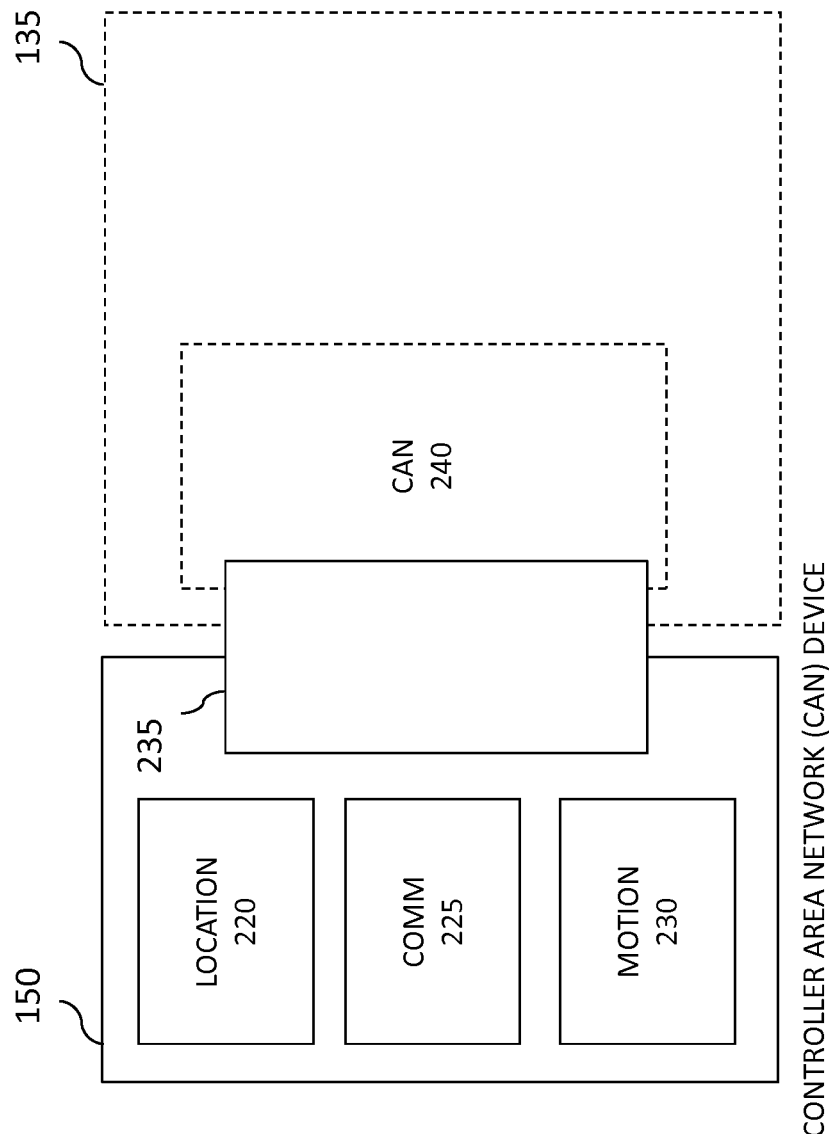
FIG. 2 is a block diagram illustrating a device configured to collect data from an electric vehicle.

As described herein, in some embodiments, the connected vehicle system 125 communicates with the data collection device 150 to collect, receive, and/or access data from the CAN of the electric vehicle 130 and/or other types of data associated with the electric vehicle (e.g., geographical information that identifies a location of an electric vehicle, movement information that identifies whether the electric vehicle is in motion or not, and so on). FIG. 2 is a block diagram illustrating the data collection device 150, which is configured to collect data from the electric vehicle 130.

In some embodiments, the data collection device 150 includes a connection component 235 that is configured to connect the device 150 to a controller area network (CAN) 240 of the computing device 135 of the electric vehicle 130, and capture or collect information from the controller area network 240.

The data collection device may also include a location component (e.g., a GPS component) 220 that is configured to capture information associated with a location of the electric vehicle, a communication component (e.g., GSM or other wireless or mobile communication chip) 225 that is configured to transmit information captured by the device to a server component, and/or a motion component (e.g., accelerometer) 230 that is configured to capture information associated with movement of the electric vehicle.

For example, the data collection device 150 may include a connection component that collects data (e.g., charge state data) from the CAN bus 240 of the electric vehicle 130, such as a component that performs various routines or algorithms to transmit a request message to the CAN bus 240 to send a response message that includes information associated with a status or operation of components of the electric vehicle 130, and receive a response message from the controller area network that includes information associated with the status or operation of the components of the electric vehicle 130.

The data collection device 150 may also collect data associated with a current trip or environment within which the electric vehicle is located, such as a global positioning system (GPS) component that collects data associated with a current or previous geographical location of the electric vehicle 130, an accelerometer that collects data associated with previous or current motion of the electric vehicle 130, and so on. The data collection device may also include a global system for mobile communications (GSM) chip that communicates the collected data to the connected vehicle system 125 at a server over the network 105.

Figure 3:
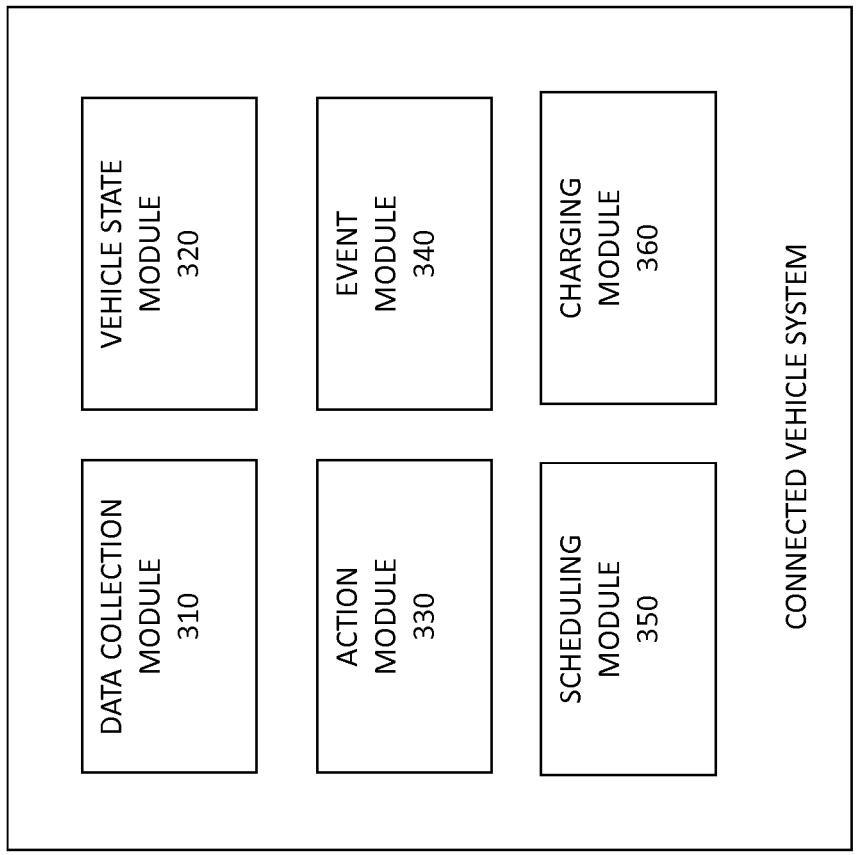
FIG. 3 is a block diagram illustrating a connected vehicle system.

As described herein, the connected vehicle system 125 may include various components configured to determine a state of the electric vehicle 125 based on data collected from or about the electric vehicle 130, and/or perform actions associated with the collected data and/or determined state. FIG. 3 is a block diagram illustrating components of the connected vehicle system 125, such as a data collection module 310, a vehicle state module 320, an action module 330, an event module 340, and a scheduling module 350.

As illustrated in FIG. 3, the connected vehicle system 125 includes a variety of functional modules. One skilled in the art will appreciate that the functional modules are implemented with a combination of software (e.g., executable instructions, or computer code) and hardware (e.g., at least a memory and processor). Accordingly, as used herein, in some embodiments a module is a processor-implemented module and represents a computing device having a processor that is at least temporarily configured and/or programmed by executable instructions stored in memory to perform one or more of the particular functions that are described herein.

In some embodiments, the data collection module 310 is configured and/or programmed to access, receive, capture and/or collect data associated with the electric vehicle 130, such as data captured by the remote data collected device 150 from the controller area network 240 of the electric vehicle 130 and/or data captured by sensors (e.g., GPS chips, accelerometers, and so on) contained by the remote device 150.

In some embodiments, the vehicle state module 320 is configured and/or programmed to determine a state of the electric vehicle 130 based on the accessed or collected data. For example, the vehicle state module 320 may determine whether a vehicle is currently charging, is plugged into a charging station but not charging, and/or is not charging and not plugged into a charging station, based on data collected from the electric vehicle 130 that identifies a charge mode of the electric vehicle 130. As another example, the vehicle state module 320 may determine determining a battery power state (e.g., battery is full, battery is low, battery is sufficiently charged) for the electric vehicle 130, based on data collected from the electric vehicle 130 that identifies a power level of a battery pack of the electric vehicle 130.

In some embodiments, the action module 330 is configured and/or programmed to perform an action that is associated with the determined state of the electric vehicle and/or the collected data that is associated with the electric vehicle 130. For In some embodiments, the event module 340 is configured and/or programmed to identify and/or determine events or other conditions associated with the electric vehicle 130 based on the collected data that is associated with the electric vehicle 130.

In some embodiments, the scheduling module 350 is configured and/or programmed to schedule the charging of a group of vehicles based on the determined state of a group of electric vehicles and/or the collected data that is associated with the group of electric vehicles 130.

In some embodiments, the charging module 360 is configured and/or programmed to determine and/or select a time at which charging is activated, the power drawn during the charging event, whether to throttle the charging, when to pause or delay a charging event, to what battery level the vehicle should be charged, and so on.

Examples of Performing Actions Based on a State of an Electric Vehicle

Figure 4:
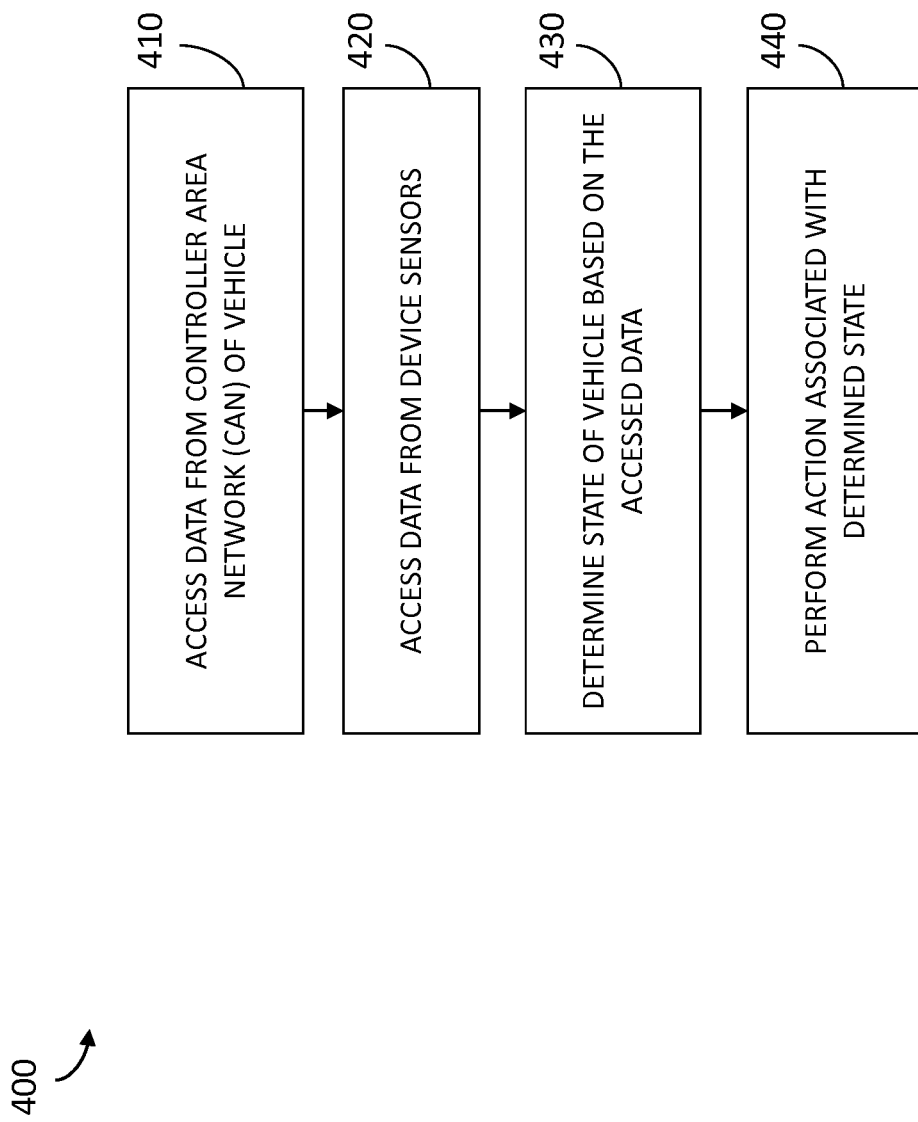
FIG. 4 is a flow diagram illustrating a method for performing an action associated with data collected from a controller area network of an electric vehicle.

As described herein, in some embodiments, the connected vehicle system 125 performs various processes and/or methods to perform actions based on a determined state or data collected from an electric vehicle. FIG. 4 is a flow diagram illustrating a method 400 for performing an action associated with data collected from a controller area network of an electric vehicle. The method 400 may be performed by the connected vehicle system 125 and, accordingly, is described herein merely by way of reference thereto. It will be appreciated that the method 400 may be performed on any suitable hardware.

In operation 410, the connected vehicle system 125 accesses data captured by a remote device from a controller area network of an electric vehicle. For example, the data collection module 310 may access, receive, capture and/or collect data directly from the electric vehicle 130, such as data captured by the remote data collected device 150 from the controller area network 240 of the electric vehicle 130.

In operation 420, the connected vehicle system 125 accesses data captured by sensors contained by the remote device. For example, the data collection module 310 may access, receive, capture and/or collect data associated with the electric vehicle 130, such as data captured by sensors (e.g., GPS chips, accelerometers, and so on) contained by the remote device 150.

In operation 430, the connected vehicle system 125 determines a state of the electric vehicle based on the accessed data. For example, the vehicle state module 320 may determine whether a vehicle is currently charging, is plugged into a charging station but not charging, and/or is not charging and not plugged into a charging station, based on data collected from the electric vehicle 130 that identifies a charge mode of the electric vehicle 130, As another example, the vehicle state module 320 may determine a battery power state (e.g., battery is full, battery is low, battery is sufficiently charged) for the electric vehicle 130, based on data collected from the electric vehicle 130 that identifies a power level of a battery pack of the electric vehicle 130.

In operation 440, the connected vehicle system 125 performs an action that is associated with the determined state and/or the accessed data. For example, the action module 330 may initiate a charging event with the electric vehicle 130, send a message to a driver of the electric vehicle 130, and so on.

Figure 5:
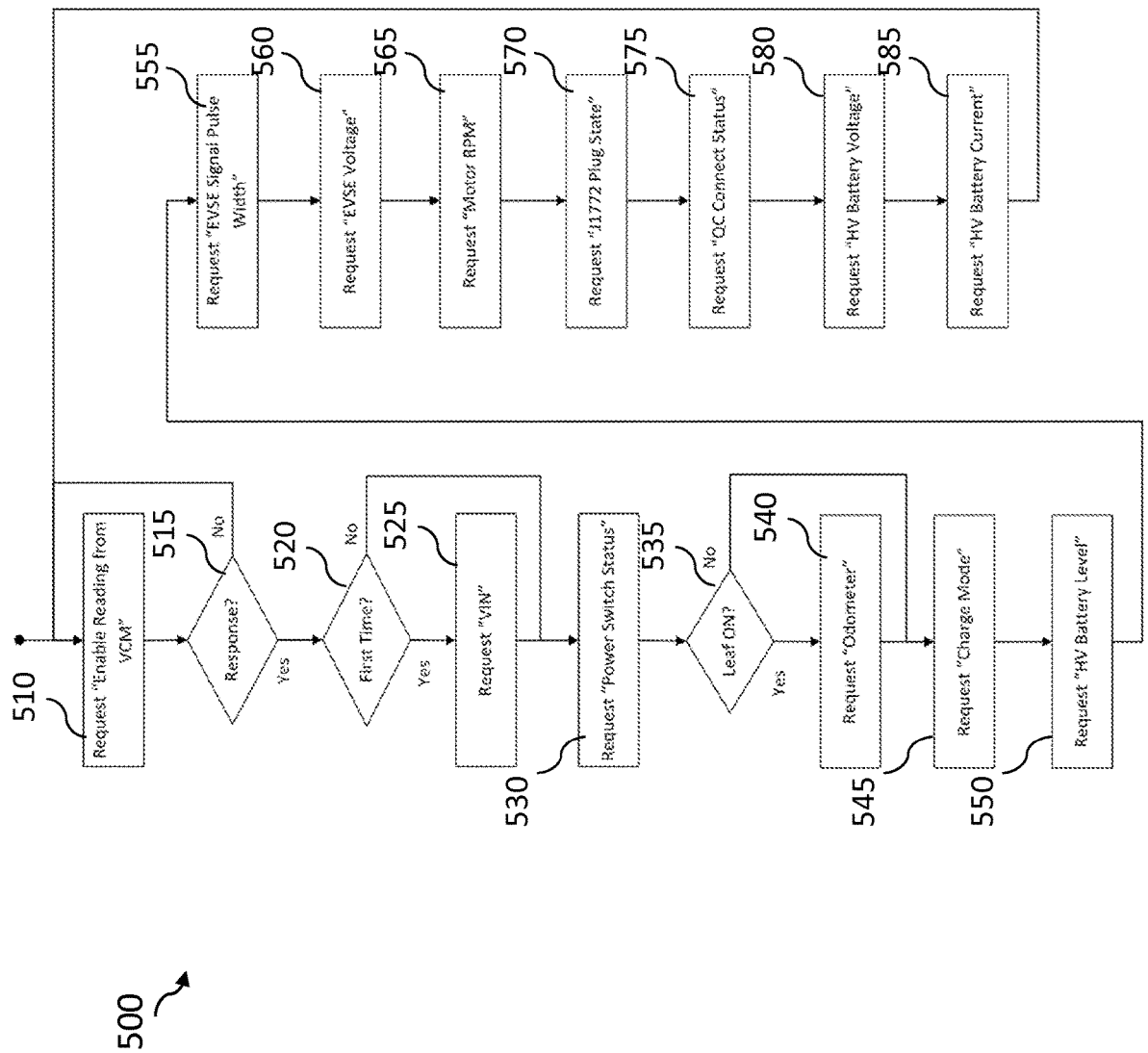
FIG. 5 is a flow diagram illustrating a method for collecting data from a controller area network.

As described herein, the connected vehicle system 125 may collect a variety of information from the CAN bus 240 of the electric vehicle 130, such as via the data collection device 150, which is not part of the electric vehicle 130 but connected to the computing device 135 via the CAN bus 240. FIG. 5 is a flow diagram illustrating a method 500 for collecting data from a controller area network. The method 500 may be performed by the data collection device 150 and, accordingly, is described herein merely by way of reference thereto. It will be appreciated that the method 400 may be performed on any suitable hardware.

The data collection device 150, in operation 510, sends a request to "enable reading from VCM," or the CAN bus 240. In operation, the device 515 determines if a response has been received from the CAN bus 240. If a response has been received, method 500 proceeds to operation 520, else the method proceeds back to operation 510 and reinitiates the request at a later time. In operation 520, the device 150 determines whether this the first time the device 150 has collected data from the CAN bus 240 of the electric vehicle. If this is the first time, the method 500 proceeds to operation 525 and requests the Vehicle Identification Number (VIN) of the electric vehicle 130, else the method proceeds to operation 530 and begins sending requests for information from the CAN bus 240, as follows:

In operation 530, the device 150 requests the power switch status of the electric vehicle 130;

In operation 535, the device 150 determines whether the electric vehicle 130 is on, and if the electric vehicle 130 is on, requests, in operation 540, information from the odometer of the electric vehicle 130;

In operation 545, the device 150 requests the charge mode of the electric vehicle 130;

In operation 550, the device 150 requests the battery level of the electric vehicle 130;

In operation 555, the device 150 requests the Electric Vehicle Supply Equipment (EVSE) Signal Pulse Width associated with the electric vehicle 130;

In operation 560, the device 150 requests the Electric Vehicle Supply Equipment (EVSE) Voltage associated with the electric vehicle 130;

In operation 565, the device 150 requests the Motor RPM of the electric vehicle 130;

In operation 570, the device 150 requests the Plug State associated with the electric vehicle 130;

In operation 575, the device 150 requests the Connect Status of the electric vehicle 130;

In operation 580, the device 150 requests the Battery Voltage of the electric vehicle 130; and/or In operation 585, the device 150 requests the Battery Current of the electric vehicle 130.

Of course, the device 150 may request other information from the CAN bus 240 of the electric vehicle 130.

Thus, in some embodiments, the data collection device 150 may transmit a request to the controller area network 240 to send a response message that includes information identifying and/or indicating a state of charge of the electric vehicle or other information, receive a response message from the controller area network that includes information identifying or indicating the state of charge of the electric vehicle, and, transfer the identified state of charge to the server that supports the connected vehicle system 125.

Examples of Detecting Events Based on Data Collected from an Electric Vehicle

As described herein, in some embodiments, the system and method may collect data from the controller area network of the electric vehicle, compare the collected data to data collected from a group of electric vehicles that includes the electric vehicle, and perform an action in response to the comparison.

FIG. 6 is a flow diagram illustrating a method 600 for performing an action based on a comparison of data collected from a controller area network of an electric vehicle. The method 600 may be performed by the connected vehicle system 125 and, accordingly, is described herein merely by way of reference thereto. It will be appreciated that the method 600 may be performed on any suitable hardware.

In operation 610, the connected vehicle system 125 collects data, as described herein, from a controller area network of an electric vehicle. For example, the data collection module 310 may access, receive, capture and/or collect data associated with the electric vehicle 130, such as data captured by the remote data collected device 150 from the controller area network 240 of the electric vehicle 130 (e.g., charge mode or battery level data) and/or data captured by sensors (e.g., GPS chips, accelerometers, and so on) contained by the remote device 150.

Example data/information that may be collected includes battery information (e.g., an average state of charge of the battery of a time period, an average depth of discharge of the battery of the time period, the temperature of the battery, a number of cycles for the battery, the c-rate of some or all cycles of the battery, and so on), outside temperature information, inside temperature information, internal engine or component temperatures, motor rpm information, motor temperature information, power consumption information, charger temperature information, information associated with peak power consumption, location or geographical information, tire pressure information, tire temperature information, information captured by seat pressure sensors, error codes or other operational information, and so on.

In operation 620, the connected vehicle system 125 may compare the collected data to data collected from a group of electric vehicles that includes the electric vehicle. For example, the event module 340 may determine the data collected from the controller area network 240 of the electric vehicle 130 indicates a failure event associated with a component of the electric vehicle, may determine the data collected from the controller area network 240 of the electric vehicle 130 indicates a potential failure event associated with a component of the electric vehicle, may compare the collected data to data collected from electric vehicles of a same make and model as a make and model of the electric vehicle 130, comparing the collected data to data collected from electric vehicles having a similar battery pack as a battery pack of the electric vehicle 130, comparing the collected data to data collected from electric vehicles associated with a charging network that includes the electric vehicle 130 as a member, and so on.

For example, the event module 340 may determine data collected from the CAN 240 of the electric vehicle 130 indicates, with a certain likelihood (e.g., above a certain threshold percentage) that one or more components of the electric vehicle 130 will fail within a certain time period. The event module 340 may match the collected data to previously collected data from other vehicle having components that previously failed and/or may determine the collected data is indicative of a future failure of the one or more components (e.g., collected state of charge and/or discharge data from the battery indicates a likely degradation of the battery based on historical performances of batteries of other electric vehicles under control and/or associated with the connected vehicle system 125 having similar state of charge and/or discharge data patterns).

As another example, the event module may compare the collected data to one or more data patterns associated with failure events and determined from the data collected from a group of electric vehicles, and identify the potential failure event at the component of the electric vehicle when the collected data matches the one or more data patterns associated with the failure events.

In operation 630, the connected vehicle system 125 performs an action in response to the comparison. For example, the action module 330 may generate an alert message that identifies a failure event associated with the component of the electric vehicle 130, may generate an alert message that identifies the potential failure event associated with the component of the electric vehicle 130, and so on.

Thus, in some embodiments, the connected vehicle system 125 may collect data from a controller area network of an electric vehicle, compare the collected data to data collected from a group of electric vehicles that includes the electric vehicle, identify a potential failure event at a component of the electric vehicle based on the comparison, and perform an action in response to the identified potential failure event.

Examples of Scheduling the Charging of a Group of Electric Vehicles

As described herein, in some embodiments, the system and method may monitor charge states of multiple vehicles within a group of vehicles, determine an order via which to charge the group of vehicles based on the monitored charge states, and cause the vehicles to be charged in the determined order.

Figure 7A:
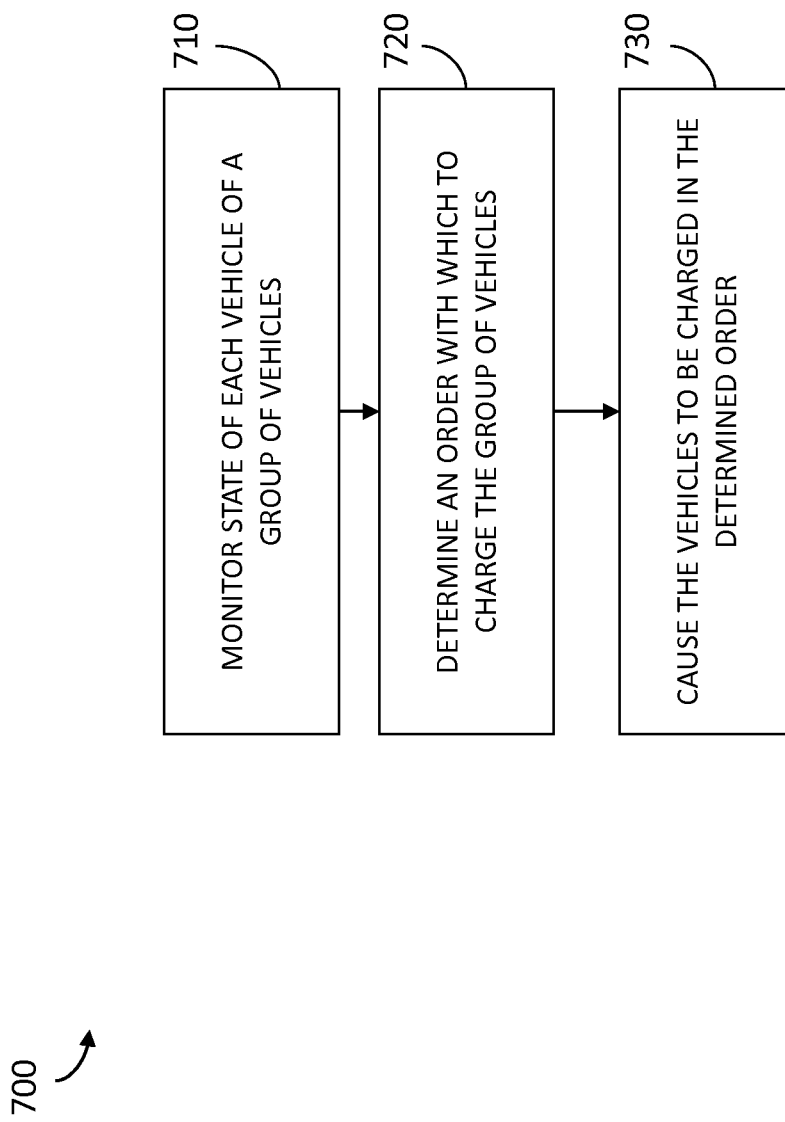
FIG. 7A is a flow diagram illustrating a method for charging a group of electric vehicles.

FIG. 7A is a flow diagram illustrating a method 700 for charging a group or fleet of electric vehicles. The method 700 may be performed by the connected vehicle system 125 and, accordingly, is described herein merely by way of reference thereto. It will be appreciated that the method 700 may be performed on any suitable hardware.

In operation 710, the connected vehicle system 125 monitors charge states of multiple vehicles within a group of vehicles. For example, the connected vehicle system 125 may transmit, via the device 150 connected to the controller area network 240 of the electric vehicle 130, a request to the controller area network 240 to send a response message that includes information identifying a state of charge of the electric vehicle 130, receive, at the device 150, a response message from the controller area network 240 that includes information identifying the state of charge of the electric vehicle 130, and transfer, from the device 150 to a server, the identified state of charge.

The connected vehicle system 125 may monitor different groups of vehicles, including some or all vehicles within a fleet of vehicles, some or all vehicles within a group of vehicles associated with a charging network, and so on.

In operation 720, the connected vehicle system 125 determines an order via which to charge the group of vehicles based on the monitored charge states. For example, the scheduling module 350 may generate an order that is based on a level of charge for battery packs within the vehicles, may generate an order that is based on a level of charge for battery packs within each of the vehicles and a time for a predicted next use of each of the vehicles, and so on.

In operation 730, the connected vehicle system 125 causes the vehicles to be charged in the determined order. For example, the scheduling module 350 may communicate instructions to the CAN bus 240 of the electric vehicle 130 via the device 150 and/or communicate instructions to associated charging stations in order to start, stop, and/or pause the charging events or sessions associated with the group of electric vehicles.

Examples of Charging an Electric Vehicle Under a Charging Protocol

As described herein, in some embodiments, the system and method may cause an electric vehicle to be charged under, based on, or using a charging protocol. The charging protocol may be based on a state of charge of the electric vehicle, behavior or other characteristic information associated with a driver of the electric vehicle, and/or other factors.

The charging protocol may define a schedule or time period via which to charge the vehicle and/or may dynamically start, resume, stop, or otherwise modify a current charging of the vehicle. Thus, in some embodiments, the charging of a vehicle is tied to event-based processing of the determined state of the vehicle, historical or previous patterns associated with the vehicle and/or the driver of the vehicle, current or historical conditions associated with the electric grid or other energy source providing the charge, cost or other information associated with the charging station and/or charging network providing access to the charge, and so on.

FIG. 7B is a flow diagram illustrating a method 750 for charging an electric vehicle using a determined charging protocol. The method 750 may be performed by the connected vehicle system 125 and, accordingly, is described herein merely by way of reference thereto. It will be appreciated that the method 750 may be performed on any suitable hardware.

In operation 760, the connected vehicle system 125 monitors the state of a charging vehicle and/or the behavior of the driver of the vehicle. For example, the vehicle state module 320 may determine whether a vehicle is currently charging, is plugged into a charging station but not charging, and/or is not charging and not plugged into a charging station, based on data collected from the electric vehicle 130 that identifies a charge mode of the electric vehicle 130.

In operation 770, the connected vehicle system 125 determines a charging protocol based on the monitored state and/or the behavior. For example, the charging module 360 may determine and/or select a time at which charging is activated, the power drawn during the charging event, whether to throttle the charging, when to pause or delay a charging event, to what battery level the vehicle should be charged, and so on.

In operation 780, the connected vehicle system 125 causes the vehicle to be charged based on the determined protocol. For example, the charging module 360 may send control information or command packets to a charging station to control when charge is provided to the electric vehicle based on the determined charging protocol.

Examples of Generating a Charging Protocol

As described herein, in some embodiments, the system and method may generate a charging protocol based on a variety of factors, such as a state of charge of the electric vehicle, behavior or other characteristic information associated with a driver of the electric vehicle, cost information associated with an electric grid or other energy source providing the charge, and so on. For example, the system and method may identify and/or determine a vehicle's capacity to draw power or energy from a charging station, identify a current or predicted use of the vehicle based on driver behavior information, determine a current cost or pricing associated with charging the vehicle at a current or later time, and generate a charging protocol via which to charge the vehicle (or, vehicles).

FIG. 8 is a flow diagram illustrating a method 800 for generating a charging protocol for an electric vehicle. The method 750 may be performed by the connected vehicle system 125 and, accordingly, is described herein merely by way of reference thereto. It will be appreciated that the method 750 may be performed on any suitable hardware.

In operation 810, the connected vehicle system 125 determines a state of the electric vehicle. For example, the vehicle state module 320 may determine whether a vehicle is currently charging, is plugged into a charging station but not charging, and/or is not charging and not plugged into a charging station, based on data collected from the electric vehicle 130 that identifies a charge mode of the electric vehicle 130.

In operation 820, the connected vehicle system 125 determines a behavior of the driver of the electric vehicle. For example, the connected vehicle system 125 determines when the vehicle will next be used, how many miles the vehicle will be driven (the range) before a next charging event, and so on.

In operation 830, the connected vehicle system 125 receives information identifying a cost to charge the vehicle. For example, the connected vehicle system 125 may receive information from a charging network, from the electric grid, from a broker, and so on, that identifies a current cost of charge, a future cost of charge, a predicted future cost of charge, and so on.

In operation 840, the connected vehicle system 125 generates a charging protocol based on the comparison of the determined state of the vehicle, driver behavior information, and cost information. For example, the connected vehicle system 125 may select a first time window via which to charge the vehicle to a certain battery level (e.g., a window where charge costs more, but which allows the vehicle to be at a certain baseline battery level), and select a second, later, time window via which to the charge the vehicle to a full level (e.g., a window where charge is cheaper).

Therefore, in some embodiments, the connected vehicle system 125 utilizes information captured and/or collected by the device 150 to inform charging decisions, performed actions, charging protocols, and/or other behavior associated with charging electric vehicles.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventors reserve the right to add additional claims after filing the application to pursue such additional claim forms for other aspects of the system.

The invention claimed is:

1. A method, comprising:
    accessing a first set of data captured by a remote device connected to an on-board diagnostics system of a controller area network of an electric vehicle;
    accessing a second set of data captured by sensors contained by the remote device;
    determining a current state of the electric vehicle based on the first set of data and the second set of data; and
    initiating a charging event for the electric vehicle.

2. The method of claim 1, wherein accessing data captured by a remote device connected to a controller area network of an electric vehicle includes accessing data that identifies a charge mode of the electric vehicle; and wherein determining a current state of the electric vehicle based on the accessed data includes determining whether the electric vehicle is currently charging.

3. The method of claim 1, wherein accessing data captured by a remote device connected to a controller area network of an electric vehicle includes accessing data that identifies a power level of a battery of the electric vehicle; and wherein determining a current state of the electric vehicle based on the accessed data includes determining a battery power state for the electric vehicle.

4. The method of claim 1, wherein initiating the charging event for the electric vehicle includes charging the electric vehicle.

5. The method of claim 1, wherein accessing the first set of data includes receiving the first set of data from a controller area network bus of the electric vehicle.

6. The method of claim 1, wherein the on-board diagnostics system captures the first set of data from an engine and battery pack of the electric vehicle.

7. A non-transitory, computer-readable medium whose contents, when executed by a computing system, cause the computing system to perform a method, the method comprising:
    accessing a first set of data captured by a remote device connected to an on-board diagnostics system of a controller area network of an electric vehicle;
    accessing a second set of data captured by sensors contained by the remote device;
    determining a current state of the electric vehicle based on the first set of data and the second set of data; and
    initiating a charging event for the electric vehicle.

8. The non-transitory, computer-readable medium of claim 7, wherein accessing data captured by a remote device connected to a controller area network of an electric vehicle includes accessing data that identifies a charge mode of the electric vehicle; and wherein determining a current state of the electric vehicle based on the accessed data includes determining whether the electric vehicle is currently charging.

9. The non-transitory, computer-readable medium of claim 7, wherein accessing data captured by a remote device connected to a controller area network of an electric vehicle includes accessing data that identifies a power level of a battery of the electric vehicle; and wherein determining a current state of the electric vehicle based on the accessed data includes determining a battery power state for the electric vehicle.

10. The non-transitory, computer-readable medium of claim 7, wherein initiating the charging event for the electric vehicle includes charging the electric vehicle.

11. The non-transitory, computer-readable medium of claim 7, wherein accessing the first set of data includes receiving the first set of data from a controller area network bus of the electric vehicle.

12. The non-transitory, computer-readable medium of claim 7, wherein the on-board diagnostics system captures the first set of data from an engine and battery pack of the electric vehicle.

13. A method, comprising:
- accessing a first set of data captured by a remote device connected to a controller area network (CAN) of an electric vehicle;
- accessing a second set of data captured by sensors contained by the remote device;
- determining a current state of the electric vehicle based on the first set of data and the second set of data; and
- charging the electric vehicle based on the determined current state of the electric vehicle.

14. The method of claim 13, wherein accessing the first set of data includes receiving the first set of data from a CAN bus of the electric vehicle.

15. The method of claim 13, wherein the CAN captures the first set of data from an engine and battery pack of the electric vehicle.

* * * * *